(12) United States Patent
Zinner

(10) Patent No.: US 11,647,045 B2
(45) Date of Patent: May 9, 2023

(54) MONITORING A NETWORK CONNECTION FOR EAVESDROPPING

(71) Applicant: Continental Automotive GmbH, Hannover (DE)

(72) Inventor: Helge Zinner, Frankfurt am Main (DE)

(73) Assignee: Continental Automotive GmbH

( * ) Notice: Subject to any disclaimer, the term of this patent is extended or adjusted under 35 U.S.C. 154(b) by 51 days.

(21) Appl. No.: 17/267,895

(22) PCT Filed: Aug. 15, 2019

(86) PCT No.: PCT/EP2019/071973
§ 371 (c)(1),
(2) Date: Feb. 11, 2021

(87) PCT Pub. No.: WO2020/035576
PCT Pub. Date: Feb. 20, 2020

(65) Prior Publication Data
US 2021/0194922 A1    Jun. 24, 2021

(30) Foreign Application Priority Data
Aug. 17, 2018    (DE) .................... 10 2018 213 898.2

(51) Int. Cl.
*H04L 9/40*    (2022.01)
*H04L 43/0852*    (2022.01)
*H04L 43/106*    (2022.01)

(52) U.S. Cl.
CPC ...... *H04L 63/1475* (2013.01); *H04L 43/0858* (2013.01); *H04L 43/106* (2013.01); *H04L 63/1466* (2013.01)

(58) Field of Classification Search
CPC ............. H04L 63/1475; H04L 43/0858; H04L 43/106; H04L 63/1466
See application file for complete search history.

(56) References Cited

U.S. PATENT DOCUMENTS 6,654,589 B1    11/2003 Haumont
9,769,023 B2    9/2017 Nickel et al.
(Continued)

FOREIGN PATENT DOCUMENTS

DE    69824430 T2    6/2005
DE    102013212106 A1    1/2015
(Continued)

OTHER PUBLICATIONS

Dai, Y.S., et al., "Autonomic Security and Self-Protection based on Feature-Recognition with Virtual Neurons," Sep. 30, 2006, 8 pages, Proceedings of the 2nd IEEE International Symposium on Dependable, Autonomic and Secure Computing, IBN: 978-0-7695-2539-6, XP031036844.
(Continued)

*Primary Examiner* — Aftab N. Khan
(74) *Attorney, Agent, or Firm* — RatnerPrestia

(57) ABSTRACT

A method for detecting unauthorized eavesdropping. A first subscriber determines a transit time for the transmission of data to a second subscriber, adds the random value to the transit time to obtain a waiting time, waits for the waiting time, creates a data packet containing a time stamp and transmits this data packet to the second subscriber. The second subscriber records the time it receives the data packet and compares it with the time stamp contained in the data packet, determines that the data packet has arrived either: before the time indicated in the time stamp, more than a predefined tolerance time after the time indicated in the time stamp, or before or more than a predefined tolerance time after a time at which it can be expected in the second subscriber as an indication that communication between the first subscriber and the second subscriber is being eavesdropped on.

15 Claims, 2 Drawing Sheets

(56) References Cited

U.S. PATENT DOCUMENTS

| | | | |
|---|---|---|---|
| 10,630,720 | B2 | 4/2020 | Voelker et al. |
| 2008/0104672 | A1* | 5/2008 | Lunde ................. H04L 63/1441 726/3 |
| 2010/0088766 | A1 | 4/2010 | Michaely et al. |
| 2015/0236940 | A1* | 8/2015 | Zinner .............. H04L 12/40136 709/224 |
| 2016/0208906 | A1 | 7/2016 | Hechler et al. |
| 2016/0337399 | A1* | 11/2016 | Kamath .............. H04L 63/0428 |
| 2017/0026144 | A1* | 1/2017 | Zinner .................. H04L 63/123 |
| 2020/0396249 | A1* | 12/2020 | Shabtai .................. H04L 43/50 |

FOREIGN PATENT DOCUMENTS

| | | |
|---|---|---|
| DE | 102014200558 A1 | 7/2015 |
| DE | 102014204033 A1 | 9/2015 |
| DE | 102014214823 A1 | 2/2016 |
| DE | 102012216689 B4 | 5/2017 |
| WO | 2015095631 A1 | 6/2015 |

OTHER PUBLICATIONS

International Search Report and Written Opinion for international Application No. PCT/EP2019/071973, dated Oct. 23, 2019, with partial English translation, 10 pages.

International Search Report and Written Opinion for International Application No. PCT/EP2019/071973, dated Oct. 23, 2019, 16 pages (German).

German Examination Report for German Application No. 10 2018 213 898.2, dated Jul. 4, 2019, 5 pages (German).

\* cited by examiner

MONITORING A NETWORK CONNECTION FOR EAVESDROPPING

CROSS REFERENCE TO RELATED APPLICATIONS

This application is the U.S. National Phase Application of PCT International Application No. PCT/EP2019/071973, filed Aug. 15, 2019, which claims priority to German Patent Application No. 10 2018 213 898.2, filed Aug. 17, 2018, the contents of such applications being incorporated by reference herein.

FIELD OF THE INVENTION

The invention relates to a method which can be used to monitor Ethernet networks in vehicles, in particular, in order to determine whether the communication is being eavesdropped on by a subscriber looped in without authorization.

BACKGROUND OF THE INVENTION

For the interconnection of control units, sensors and actuators in a vehicle, networks have long been used instead of individual point-to-point connections, in order to save costs and weight for the wiring. For this purpose, bus systems such as CAN, MOST and FlexRay are most commonly used. It is also desirable in future to use Ethernet, which has established itself as the most common standard for networks outside of vehicles.

The fact that the transition from individual point-to-point connections to a network saves wiring effort is the direct consequence of the fact that a plurality of subscribers share a physical transmission medium (for instance a cable) in a network. This also simultaneously reduces the effort for attackers wishing to eavesdrop on the communication without authorization. The aim of such eavesdropping may be, for example, to study the behavior of devices in order to reverse-engineer the software of the device, for example, without authorization or to simulate the behavior of the device using a replacement device. Such unauthorized replacement can be used to pursue the aim, for example, of implanting a control unit which makes it possible to start a stolen vehicle without the original key.

In order to eavesdrop on the communication on a line path, it is necessary to loop a passive reader into the line path in a network which is not constructed in the form of a bus. For this purpose, the line path is disconnected and the passive reader has two transceivers (PHYs), to which the two disconnected ends are connected. A data packet arriving at one PHY is then channeled for further processing or stored by the passive reader and is simultaneously emitted onto the remaining section of the line path again by the second PHY.

The line path is therefore augmented by two additional PHYs. Since the signal processing within the PHYs functions only at a finite speed in each case, the travel of an eavesdropped data packet is inevitably delayed. Monitoring the packet transit time therefore makes it possible to detect whether a data packet has passed directly from a first subscriber to a second subscriber or whether it has also passed through the further PHYs of the passive reader en route. Corresponding checking methods are known from DE 10 2012 216 689 B4 and DE 10 2014 204 033 A1, each incorporated by reference herein.

SUMMARY OF THE INVENTION

An aspect of the invention provides a developed method for detecting unauthorized eavesdropping on the communication between a first subscriber and a second subscriber of a network.

In this method, the first subscriber determines a transit time for the transmission of data to the second subscriber via the network. This can be carried out in any desired manner. For example, the transit time can be effected as part of time synchronization between the first subscriber and the second subscriber, for instance according to the time synchronization standard IEEE 802.1AS and the PTP protocol contained therein. The "delay request" and "peer delay" messages implemented within the scope of this protocol can thus be used as data packets, for instance. However, the method is not restricted to this. The important factor is only that the transit time is determined in some form on the basis of an actual physical condition of the transmission path from the first subscriber to the second subscriber, that is to say there is a physical condition or property of the transmission path, the change in which results in a change in the determined transit time.

The first subscriber determines a random value and adds the random value to the transit time in order to obtain a waiting time. In this case, the random value may be positive or negative. In particular, a distribution of positive and negative random values can fluctuate around zero or any desired other expected value, for example.

The first subscriber waits for the waiting time, creates at least one data packet containing a time stamp and transmits this data packet to the second subscriber. The time stamp may in this case contain, in particular, a time specification which is as close as possible to the actual time at which the data packet is transmitted. The waiting time itself remains secret and is not transmitted via the network.

The second subscriber records the time at which it receives the data packet and compares this time with the time stamp contained in the data packet.

The second subscriber now assesses the determination that the data packet has arrived before the time indicated in the time stamp, that it has arrived more than a predefined tolerance time after the time indicated in the time stamp or that it arrives before a time at which it can be expected in the second subscriber as an indication that the communication between the first subscriber and the second subscriber is being eavesdropped on without authorization.

It has been recognized that the practice of forming the waiting time from the combination of the transit time for the transmission of data and the random value makes the method surprisingly particularly resistant to bypass attempts.

As explained above, the practice of looping a passive reader into a line path results in this line path then containing two further PHYs. The delay in the packet transit time caused by this can no longer be reversed by the passive reader. However, if it can be predicted from the point of view of the passive reader that a packet will be transmitted from the first subscriber to the second subscriber and what content this packet will approximately have, the passive reader can generate this packet itself and can transmit it to the second subscriber at the appropriate time. From the point of view of the second subscriber, this then appears as if the data packet had arrived directly from the first subscriber without an interposed passive reader. If the first subscriber now actually sends the data packet, this can be suppressed by the passive reader.

Such an attack is conceivable, in particular, for example, when the first subscriber and the second subscriber interchange data in a bidirectional manner according to a predefined protocol and check the packet transit time at periodic intervals, for example.

The introduction of a random component into the waiting time now ensures that the time at which the first subscriber transmits a packet, and therefore also the time at which the second subscriber expects this packet according to the time stamp, is more difficult for the passive reader to predict. This increases the probability of a data packet, which is created by the passive reader in an unauthorized manner and is intended to take the place of a data packet transmitted by the first subscriber, arriving at the second subscriber at a time at which the second subscriber does not expect it and/or of there being discrepancies between the time stamp of the data packet and the time at which it arrives at the second subscriber. In particular, from the point of view of the second subscriber, it may by no means be consistent if a data packet arrives before the time at which it was allegedly transmitted or if it arrives, for instance as a response to a request from the second subscriber, earlier than is actually possible taking into account the transit time for the round trip.

In this context, the consideration of the previously determined transit time as well is an additional source of entropy which further increases security. Typical random number generators for computers and, in particular, for embedded systems or network components are not "true" random number generators in the sense that a non-deterministic physical process, for example electronic noise or radioactive decay, is converted into a digital signal. Rather, pseudo-random number generators are used here. Starting from initialization, these generators generate numerical sequences in a deterministic manner and are often also dependent on quasi-random system events for initialization. If the time at which the data packet is transmitted is varied only with a pseudo-random number generator, this time can therefore be predicted within certain limits. In this situation, the additional consideration of the transit time means that the waiting time depends on a true physical random component without additional hardware being required for this purpose.

Generally, the practice of coupling the waiting time to the previously determined transit time has the effect that identically produced and configured subscribers use different waiting times depending on the place of use in the network.

For example, a conventional delay in the transmission of packets between two PHYs is approximately 400 ns in a Gigabit Ethernet network. The addition of a further PHY causes a further delay of the order of magnitude of 100-200 ns and is therefore significant.

In one particularly advantageous configuration, the second subscriber additionally also assesses the determination that the time stamp is before or more than a predefined tolerance time after the time at which the first subscriber can have transmitted the data packet as an indication that the communication between the first subscriber and the second subscriber is being eavesdropped on without authorization. If the data packet is a response to a request from the second subscriber, for example, this response realistically cannot have been transmitted before the first subscriber can have received this request at the earliest.

In one particularly advantageous configuration, the method branches back to waiting for the waiting time and then creating and transmitting the next data packet until a predefined temporal or event-based abort condition has been met. In this case, it is additionally possible to wait for a nominal cycle time in each case. For example, a data packet can be nominally transmitted every second, wherein the waiting time is also additionally added to this second. A waiting time which is randomly determined once can then be used for the transmission of many data packets.

In response to the abort condition being met, the method branches back to determining the transit time or to determining the random value. This then results in a new waiting time. The detection of an attack on the network, for example, comes into consideration as an event-based abort condition.

In a further particularly advantageous configuration, the second subscriber keeps a history of the results of the comparisons between the times at which data packets arrive and the time stamps contained in these data packets. Furthermore, the second subscriber assesses the determination that the result of a new comparison differs significantly from this history as an indication that the communication between the first subscriber and the second subscriber is being eavesdropped on without authorization and/or that the first subscriber has been replaced with another device without authorization.

Certain fluctuations in the packet transit time are always possible, caused, for instance, by jitter or by a change in the ambient temperature. However, if the packet transit time changes suddenly, for example, this is an indication of manipulation. The consideration of the history can be used, for example, to detect a longer-term trend, for example on the basis of temperature fluctuations or on the basis of known aging curves of the crystals installed for PHYs, and to assess only changes in the packet transit time which differ from this trend as suspicious. In this respect, the tolerance limits can then be accordingly narrowed.

In this context, it has been recognized that the time needed by a PHY to process a packet varies greatly from PHY to PHY, specifically even when both PHYs nominally come from the same manufacturer. The reason for this is manufacturing tolerances of the crystals which are installed for the PHYs and generate the system clock. If the history is taken into account in the described manner, it is possible to detect whether one PHY has been replaced with another. In particular, it can therefore be detected that the first subscriber has been replaced with another device without authorization.

This detection can be used, in particular, to tie devices in the vehicle to one another in the sense of anti-theft protection.

For example, devices which cooperate with the central control unit of the vehicle (ECU) can stop the function if this central control unit has been replaced with another device without authorization. The vehicle can then no longer be started by virtue of the central control unit being replaced with a manipulated control unit which permits starting even without the original key. Furthermore, this also makes it possible to prevent other manipulations, for instance the unauthorized increase in the power or the stipulated maximum speed by replacing the central control unit.

However, anti-theft protection can also be implemented, for example, for individual devices, for example for a permanently installed navigation system. The navigation system can therefore be "shackled", for instance, to a particular vehicle by checking packet transit times to other devices, for instance the central control unit. In contrast to serial numbers and other identifiers of the devices, these packet transit times practically cannot be falsified since they are determined by the wiring architecture and, in particular, also by the PHYs involved.

Replacement of the tachometer or another control unit with the aim of "rejuvenating" a used vehicle in terms of kilometers and deceiving a buyer with an excessive present value can also be detected, for example.

According to the above description, an Ethernet network is advantageously selected as the network. Ethernet networks which are widespread are a flexible and scalable replacement for networks mainly used in automotive technology and other control technology, such as CAN, MOST and FlexRay. The downside of the widespread nature of Ethernet is that passive readers, for example, and the necessary knowledge for using them are easily available. For example, "taps" (Test Access Points), which enable unnoticed eavesdropping on the communication when the packet transit times are not checked, are common tools for diagnosing network problems. The obstacle for an attack on a vehicle network therefore initially tends to be reduced by changing to Ethernet. This is overcompensated for using the described method.

The data packet is advantageously transmitted on the physical layer of the OSI model. The actual transmission time then comes closest to the time stamp contained in the data packet.

According to the above description, the on-board network of a vehicle is advantageously selected as the network. The effect provided by the method, specifically the protection against unauthorized eavesdropping on the communication and against the replacement of devices, can also be achieved in a different manner and with an even higher security level outside vehicles, for example by using encryption. In contrast, in vehicles, it is generally not economical to buy hardware equipment sufficient for seamlessly encrypted communication for all subscribers connected to the network. The described method presupposes considerably lower hardware resources and therefore increases the security level without this being inevitably coupled to higher production costs for the network or devices connected to the latter.

In a further particularly advantageous configuration, a temperature $T_1$ in the vehicle and/or an ambient temperature $T_2$ is/are measured using a temperature sensor. The tolerance time and/or an expected transmission or reception time of the data packet is/are tracked to a change in the temperature $T_1$ and/or a change in the temperature $T_2$.

It has been recognized that the temperature is the most important physical influencing variable which changes the transit time for the transmission of packets. The tolerance time may be narrower overall by at least partially removing this influence. Therefore, from the point of view of the passive reader, it becomes more difficult to guess the correct time for the transmission of data packets which are intended to take the place of data packets transmitted by the first subscriber.

In response to the determination that the communication is being eavesdropped on without authorization and/or that the first subscriber has been replaced with another device without authorization, the functionality of a control unit, of a navigation system and/or of an entertainment system is advantageously blocked, an immobilizer of the vehicle is locked, and/or the vehicle is removed from the moving traffic by controlling a steering system, a drive system and/or a braking system of the vehicle. Said manipulations are events which do not occur during the intended use of the vehicle by the user. It is also generally known that manipulations of important components of the vehicle are not allowed and can result in the expiry of the operating permit. Partial or complete blocking of functionality, or even deactivation of the vehicle, is therefore justified.

In a further advantageous configuration, in response to the transit time being outside a range between a lower threshold value and an upper threshold value, it is determined that the network has been manipulated. In this case, the manipulations which can be captured hereby are not restricted to eavesdropping on the communication and the replacement of devices. Rather, changes to the architecture of the network can also be captured, for example. The transit time may change, for example, if the distance between the first and second subscribers changes or if a different cable type is used for the connection.

If an upper and a lower threshold value are used, it is advantageously possible to check whether the sum of the transit time and the waiting time is between the lower threshold value and the upper threshold value. If this is not the case, the waiting time can be accordingly adapted, for example by adding the lower threshold value if the sum is below the lower threshold value, or by subtracting the upper threshold value if the sum is above the upper threshold value. This makes it possible to prevent the second subscriber from already incorrectly assessing the waiting for the waiting time as manipulation.

As described above, a major advantage of the method is that it can use the line leading from the first subscriber to the second subscriber as a means for the hardware-related generation of entropy for the random formation of the waiting time even without using additional hardware. This method can be implemented, in particular, in the form of software which can be sold as an update or upgrade for existing software or firmware of subscribers in the network and in this respect constitutes an independent product. Therefore, an aspect of the invention also relates to a computer program having machine-readable instructions which, when executed on a computer, on a control unit and/or on an embedded system, cause the computer, the control unit or the embedded system to carry out the described method. An aspect of the invention likewise also relates to a machine-readable data storage medium or a download product having the computer program.

In principle, the method can also be used outside vehicles, in particular in the field of embedded systems. Depending on the area of application of these systems, there are also high security requirements there, while only a low computing power is simultaneously available for implementing additional security mechanisms. The cycles in which the hardware platforms are revised are also comparatively long, in particular when such revision renders existing certification of the platform invalid and requires new approval.

BRIEF DESCRIPTION OF THE DRAWINGS

The subject matter of an aspect of the invention is explained in the following text based on figures, but without limiting the subject matter of the invention. In the drawings.

DETAILED DESCRIPTION OF THE PREFERRED EMBODIMENTS

Figure 1:
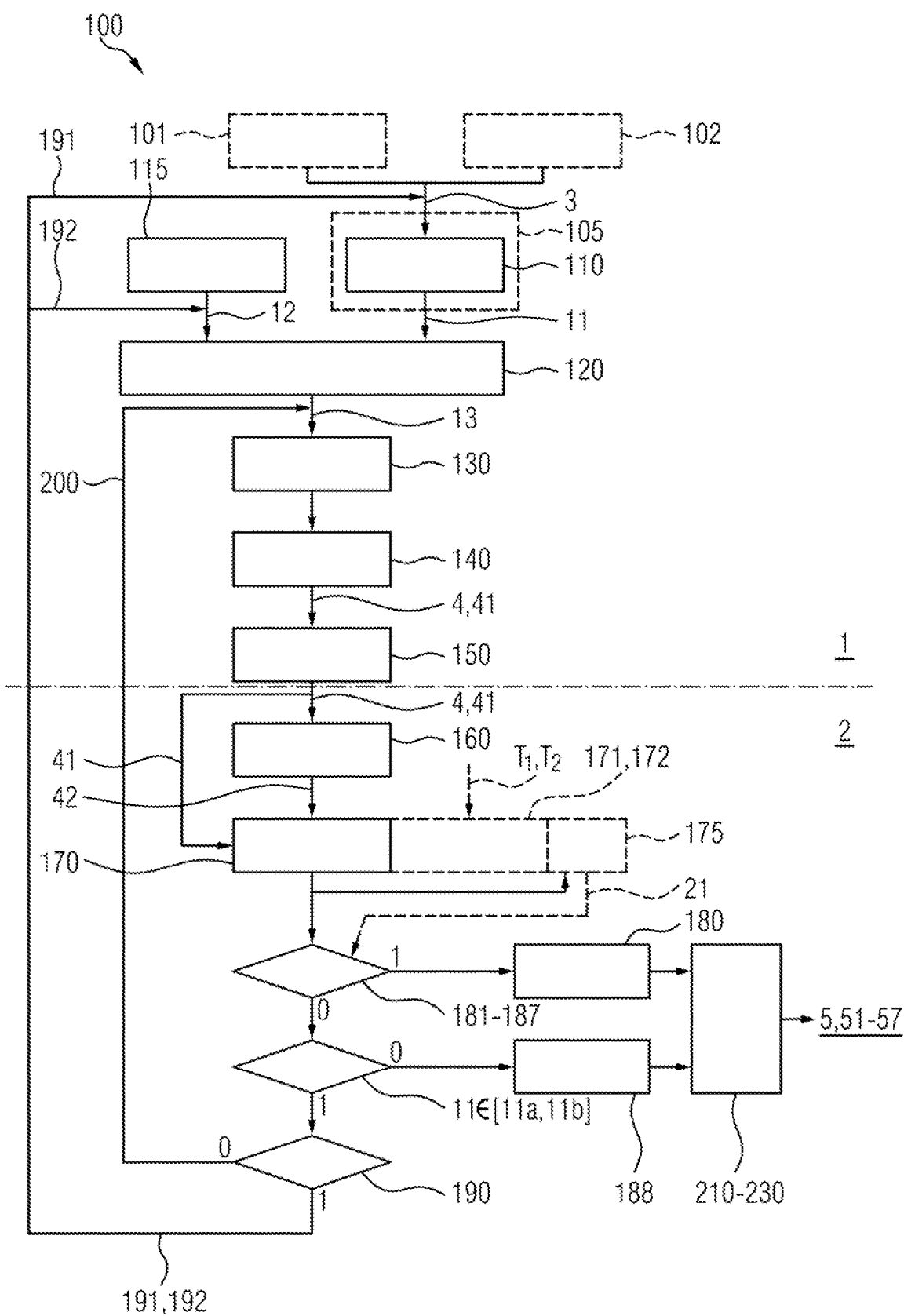
FIG. 1: shows an exemplary embodiment of the method 100.

FIG. 1 shows an exemplary embodiment of the method 100. In optional step 101, an Ethernet network is selected as the network 3. In optional step 102, an on-board network of a vehicle 5 is selected as the network 3.

In step 110, the first subscriber 1 of the network 3 determines a transit time 11 for the transmission of data to the second subscriber 2, which can take place, in particular, as part of time synchronization 105 between the first subscriber 1 and the second subscriber 2.

In step 115, the first subscriber 1 also determines a random value 12 which is added to the transit time 11 in step 120 in order to form a waiting time 13. Waiting for the waiting time 13 is carried out in step 130.

In step 140, a data packet 4 having a time stamp 41 is then generated and is transmitted to the second subscriber 2 in step 150. In step 160, the second subscriber 2 records the time 42 at which it received the data packet 4. In step 170, this time 42 is compared with the time stamp 41. If it is determined in step 181 that the data packet 4 has arrived before the time indicated in the time stamp 41, it is determined in step 182 that it has arrived more than a predefined tolerance time after the time indicated in the time stamp 41, it is determined in step 183 that it arrives before a time at which it can be expected in the second subscriber 2, it is determined in step 184 that it arrives more than a predefined tolerance time after a time at which it can be expected in the second subscriber, it is determined in step 185 that the time stamp 41 is before the time at which the first subscriber 1 can have transmitted the data packet 4, or it is determined in step 186 that the time stamp 41 is more than a predefined tolerance time after the time at which the first subscriber 1 can have transmitted the data packet 4, this is assessed in step 180 to the effect that the communication between the first subscriber 1 and the second subscriber 2 is being eavesdropped on without authorization.

In this case, the earliest possible time at which the data packet 4 can be expected in the second subscriber 2 may result, for example, from the time at which the second subscriber 2 transmitted a request 20, not depicted in FIG. 1, to the first subscriber 1. A data packet 4 transmitted in response to such a request 20 must then realistically be delayed by at least the time which is at least required for the round trip through the network 3. If the data packet 4 arrives earlier, it can only be a prefabricated data packet 4' which comes from a passive reader 6 not depicted in FIG. 1.

The time of the request 20 from the second subscriber 2 may likewise also define the time at which the first subscriber 1 can have transmitted the data packet 4 at the earliest according to the time stamp 41: The first subscriber 1 realistically cannot have transmitted the response 4 before it can have received the request 20 at the earliest.

Discrepancies between the time stamp 41 and the time at which the second subscriber 2 received the data packet 4 can also be detected when the data packet 4 is not a response to a previous request from the second subscriber 2. Such discrepancies may arise because a possible passive reader 6 cannot generate a falsified data packet 4' from a passively read true data packet 4 from the first subscriber 1 or from a passively read request 20 from the second subscriber 2. A falsified data packet 4' generated in such a manner would be ready too late in any case and would arrive even later at the second subscriber 2. Rather, the falsified data packet 4' must be produced in advance and must be transmitted at a predicted or guessed transmission time.

In optional step 171, a temperature $T_1$ in the vehicle 5 and/or an ambient temperature $T_2$ is/are measured using a temperature sensor. In optional step 172, the tolerance time and/or an expected transmission or reception time of the data packet 4 is/are tracked to a change in the temperature $T_1$ and/or to a change in the temperature $T_2$.

In optional step 175, a history 21 of the results of the comparisons 170 can be kept. If it is then determined in step 187 that the result of a new comparison 170 differs significantly from the history 21, unauthorized eavesdropping on the communication can likewise be inferred in step 180.

It is also possible to check whether the transit time 11 is actually in a plausible range between a lower threshold 11a and an upper threshold 11b. If this is not the case (truth value 0), it can be determined in step 188 that the network 3 has been manipulated.

If, in contrast, the plausible range is complied with (truth value 1) and if, at the same time, the previous checks 181-187 were unremarkable (truth value 0 in each case), it can be checked whether a temporal or event-based abort condition 190 has been met. If this is not the case (truth value 0), it is possible to branch back, in step 200, possibly after waiting for a normal periodic cycle time, to waiting for the randomly determined waiting time 13, that is to say the existing waiting time 13 can continue to be used for the next cycle.

In contrast, if the abort condition 190 has been met, the determination 110 of the transit time 11 can be updated in step 191 and/or the determination 115 of the random value 12 can be updated in step 192.

In response to the determination 180 that the communication is being eavesdropped on without authorization and/or that the first subscriber 1 has been replaced with another device 1' without authorization and/or in response to the determination 188 that the network 3 has actually been manipulated, it is possible to react in steps 210-230. In step 210, the functionality of a control unit 51, of a navigation system 52 and/or of an entertainment system 53 can therefore be blocked. In step 220, an immobilizer 54 of the vehicle 5 can be locked. In step 230, the vehicle 5 can be removed from the moving traffic by controlling a steering system 55, a drive system 56 and/or a braking system 57.

Figure 2:
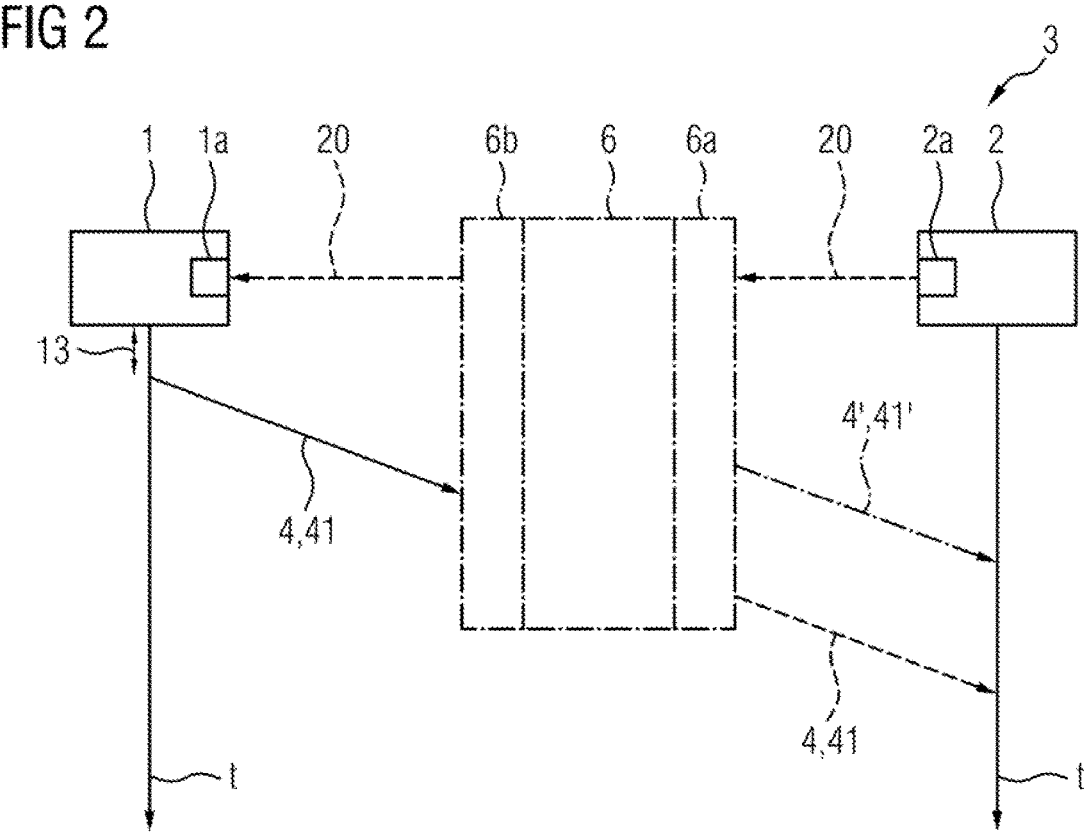
FIG. 2: shows an attack scenario on the network 3 with a passive reader 6.

FIG. 2 shows a possible attack scenario in which a passive reader 6 has been looped into a network 3 having a first subscriber 1 and a second subscriber 2. If the passive reader 6 were not present, data packets would be directly transmitted between the PHY 1a of the subscriber 1 and the PHY 2a of the subscriber 2. The passive reader 6 introduces two further PHYs 6a and 6b into the travel route for the data packets, which results in corresponding delays.

In the situation shown in FIG. 2, the second subscriber 2 sends a request 20 to the first subscriber 1 and waits for a response to it. The delay caused by the two additional PHYs 6a and 6b of the passive reader 6 is overall so large that a falsified data packet 4' with a time stamp 41', which is generated only in response to the request 20 or even in response to the true data packet 4 from the first subscriber 1, would be ready too late to be close enough to the time in the second subscriber at which the true data packet 4 with the time stamp 41 would arrive there in the absence of the passive reader 6. Instead, the passive reader 6 must already create the falsified data packet 4' and its time stamp 41' before the second subscriber 2 transmits the request 20. The passive reader 6 must therefore guess the time at which the first subscriber 1 transmits the data packet 4. This is made more difficult by the randomly determined waiting time 13.

Figure 3:
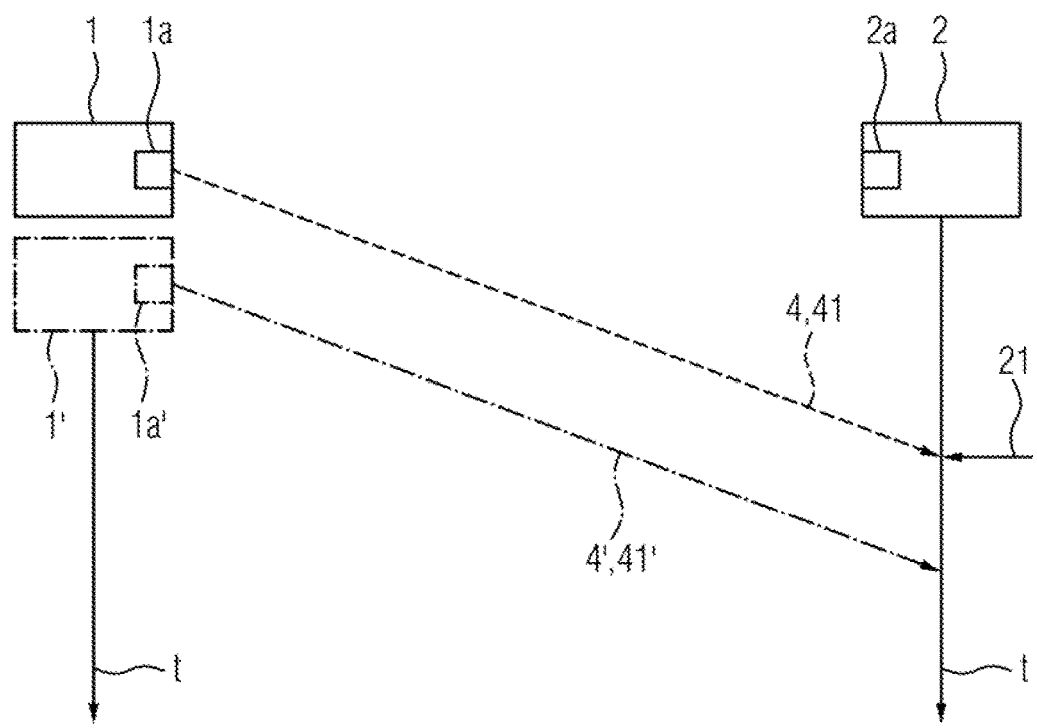
FIG. 3: shows an attack scenario on the network 3 with replacement of the first subscriber 1 with another device 1'.

FIG. 3 shows a further possible attack scenario in which the first subscriber 1 has been replaced with another device 1' with PHY 1a' in the network 3. The subscriber 1 would normally transmit a data packet 4 with a time stamp 41. The replacement device 1' instead transmits a falsified data packet 4' with a time stamp 41'. Since the PHY 1a' inevitably differs from the PHY 1a of the original first subscriber 1, it causes a different delay between the creation of the time stamp 41' and the creation of the data packet 4 than the original PHY would have caused between the creation of the time stamp 41 and the creation of the data packet 4. This results in a significantly different offset between the arrival of the data packet 4' and the time stamp 41' contained in the latter on the side of the second subscriber 2. The second subscriber 2 has created a history 21 of the offset before the first subscriber 1 is replaced with the other device 1' and can therefore detect the replacement.

LIST OF REFERENCE SIGNS

1 First subscriber of the network 3
1' Replacement device for the first subscriber 1
1a PHY interface of the first subscriber 1
1a' PHY interface of the replacement device 1'
11 Transit time from the first subscriber 1 to the second subscriber 2
11a Lower threshold for the transit time 11
11b Upper threshold for the transit time 11
12 Random value
13 Waiting time formed from the transit time 11 and the random value 12
2 Second subscriber of the network 3
2a PHY interface of the second subscriber 1
20 Request transmitted by the second subscriber 2
21 History of the results of comparisons 170
3 Network
4 True data packet from the first subscriber 1
4' Falsified data packet
41 Time stamp of the true data packet 4
41' Time stamp of the falsified data packet 4'
5 Vehicle
51 Control unit of the vehicle 5
52 Navigation system of the vehicle 5
53 Entertainment system of the vehicle 5
54 Immobilizer of the vehicle 5
55 Steering system of the vehicle 5
56 Drive system of the vehicle 5
57 Braking system of the vehicle 5
6 Passive reader
6a First PHY of the passive reader 6
6b Second PHY of the passive reader 6
100 Method
101 Selection of an Ethernet network as the network 3
102 Selection of a vehicle on-board network as the network 3
105 Time synchronization between subscribers 1 and 2
110 Determination of the transit time 11
115 Determination of the random value 12
120 Formation of the waiting time 13
130 Waiting for the waiting time 13
140 Creation of the data packet 4 with a time stamp 41
150 Transmission of the data packet 4 to the second subscriber 2
160 Recording of the reception time 42 by the subscriber 2
170 Comparison of the reception time 42 with the time stamp 41
171 Determination of the temperature $T_1$ and/or $T_2$
172 Temperature-dependent tracking
175 Comparison with history 21
180 Determination that communication has been eavesdropped on/device has been replaced
181 Arrival of the packet 4 before the time stamp 41
182 Arrival of the packet 4 too late after the time stamp 41
183 Arrival of the packet 4 before the expected time
184 Arrival of the packet 4 too late after the expected time
185 Arrival of the packet 4 before possible transmission
186 Arrival of the packet 4 too late after possible transmission
187 Deviation from the history 21
188 Determination that the network 3 has been manipulated
190 Abort condition
191 Updating of the transit time 11
192 Updating of the random value 12
200 Further use of the waiting time 13 for the next cycle
210 Blocking of a system 51-54
220 Locking of the immobilizer 54
230 Removal of the vehicle 5 from moving traffic
t Time
$T_1$ Temperature in the vehicle 5
$T_2$ Ambient temperature

The invention claimed is:

1. A method for detecting unauthorized eavesdropping on a communication, comprising:
determining, by a first subscriber device in a vehicle connected to a network in the vehicle, a transit time for the transmission of data via the network to a second subscriber device in the vehicle connected to the network;
determining, by the first subscriber device, a random value and obtaining a waiting time as a summation of the random value and the transit time;
waiting, by the first subscriber device, for the waiting time, and after waiting for the waiting time, creating at least one data packet containing a time stamp and transmitting this data packet to the second subscriber device;
recording, by the second subscriber device, a time at which it receives the data packet and comparing this time with a time stamp contained in the data packet;
determining, by the second subscriber device, that the data packet has arrived before a time indicated in the time stamp, that it has arrived more than a predefined tolerance time after the time indicated in the time stamp or that the data packet arrives before or more than a predefined tolerance time after a time at which it can be expected in the second subscriber device as an indication that the communication between the first subscriber device and the second subscriber device is being eavesdropped on without authorization; and
controlling, by a vehicle controller, the vehicle based on the determination that the second subscriber device is being eavesdropped on without authorization.

2. The method as claimed in claim 1, wherein the transit time is determined as part of time synchronization between the first subscriber and the second subscriber.

3. The method as claimed in claim 1, wherein the second subscriber keeps a history of the results of the comparisons and assesses the determination that the result of a new comparison differs significantly from this history as an indication that the communication between the first subscriber and the second subscriber is being eavesdropped on without authorization and/or that the first subscriber has been replaced with another device without authorization.

4. The method as claimed in claim 1, wherein the second subscriber additionally also assesses the determination that the time stamp is before or more than a predefined tolerance time after the time at which the first subscriber can have transmitted the data packet as an indication that the communication between the first subscriber and the second subscriber is being eavesdropped on without authorization.

5. The method as claimed in claim 1, wherein an Ethernet network is selected as the network.

6. The method as claimed in claim 1, wherein the data packet is transmitted on the physical layer of an OSI model.

7. The method as claimed in claim 1, wherein, in response to the transit time being outside a range between a lower threshold value and an upper threshold value, it is determined that the network has been manipulated.

8. The method as claimed in claim 1, wherein the method branches back to waiting for the waiting time and then creating and transmitting the next data packet until a pre-defined temporal or event-based abort condition has been met, wherein, in response to the abort condition being met, the method branches back to determining the transit time or branches back to determining the random value.

9. The method as claimed in claim 8, wherein the transit time is determined as part of time synchronization between the first subscriber and the second subscriber.

10. The method as claimed in claim 1, wherein an on-board network of a vehicle is selected as the network.

11. The method as claimed claim 10, wherein, in response to the determination that the communication is being eavesdropped on without authorization and/or that the first subscriber has been replaced with another device without authorization, the functionality of a control unit, of a navigation system and/or of an entertainment system is blocked, an immobilizer of the vehicle is locked, and/or the vehicle is removed from the moving traffic by controlling a steering system, a drive system and/or a braking system of the vehicle.

12. The method as claimed in claim 10, wherein a temperature $T_1$ in the vehicle and/or an ambient temperature $T_2$ is/are measured using a temperature sensor, and wherein the tolerance time and/or an expected transmission or reception time of the data packet is/are tracked to a change in the temperature $T_1$ and/or a change in the temperature $T_2$.

13. The method as claimed claim 12, wherein, in response to the determination that the communication is being eavesdropped on without authorization and/or that the first subscriber has been replaced with another device without authorization, the functionality of a control unit, of a navigation system and/or of an entertainment system is blocked, an immobilizer of the vehicle is locked, and/or the vehicle is removed from the moving traffic by controlling a steering system, a drive system and/or a braking system of the vehicle.

14. A non-transitory computer readable medium containing machine-readable instructions which, when executed on a computer, on a control unit and/or on an embedded system, cause the computer, the control unit or the embedded system to carry out a method as claimed in claim 1.

15. A non-transitory machine-readable data storage medium or download product comprising a computer program as claimed in claim 14.

* * * * *